United States Patent
Anderson et al.

(10) Patent No.: US 6,360,211 B1
(45) Date of Patent: *Mar. 19, 2002

(54) SYSTEM AND METHOD FOR ELECTRONICALLY PROCESSING INVOICE INFORMATION

(75) Inventors: Michael W. Anderson, Upper Saint Clair; David L. Merritt, Mount Lebanon; John W. Matthews, Allison Park, all of PA (US)

(73) Assignee: Mellon Bank, N.A., Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/383,872

(22) Filed: Aug. 26, 1999

Related U.S. Application Data

(63) Continuation of application No. 08/569,746, filed on Dec. 8, 1995, now Pat. No. 6,058,380.

(51) Int. Cl.$^7$ ................................................ G06F 17/60
(52) U.S. Cl. .............................. 705/40; 705/30; 705/34; 705/400
(58) Field of Search ................................ 705/1, 40, 30, 705/34, 400

(56) References Cited

U.S. PATENT DOCUMENTS

| | | | |
|---|---|---|---|
| 4,713,761 A | * 12/1987 | Sharpe et al. | 705/30 |
| 5,007,084 A | 4/1991 | Materna et al. | 380/24 |
| 5,253,164 A | * 10/1993 | Hollway et al. | 705/2 |

(List continued on next page.)

FOREIGN PATENT DOCUMENTS

FR  2441222  * 7/1980

OTHER PUBLICATIONS

Reams, Jr.: "Electronic Contracting Law"; EDI and Business Transactions; 1996–97 Edition published by Clark, Boardman & Callaghan of Deerfield, Il., New York, NY., and Rochester, NY; chapter 12 pp. 336–354.*

Cass Commercial Corp.'s marketing sheets, acquired in Mar. 1995 from a contact at Southwestern Bell, which acquired same during general sales visit from Cass.

Cass Commercial Corp.'s Purchasing Card pamphlet, acquired in Mar. 1995 from a contact at Southwestern Bell, which acquired same during general sales visit from Cass.

Steven Marjanovic, *CoreStates Putting Conrail Power Bills on Fast Track*, American Banker, Feb. 2, 1995 at p. 19.

NBD Bank's Utility Payment Processing slides, acquired at a conference during a joint presentation by NBD and KMart, during which copies of the slides were handed out.

OmniComp's FASER slide show on diskette, acquired from Duke Power which obtained same from OmniComp during a sales presentation.

OmniComp's Postbill Plus user's manual, acquired from Duke Power which obtained same from OmniComp during a sales presentation.

* cited by examiner

*Primary Examiner*—Edward R. Cosimano
(74) *Attorney, Agent, or Firm*—Reed Smith LLP

(57) ABSTRACT

A system and method for processing invoice information in which billing data is communicated from a first site to a second site and an automated reasonability test is performed on the billing data at the second site using a reasonability criterion.

54 Claims, 6 Drawing Sheets

U.S. PATENT DOCUMENTS

| | | | |
|---|---|---|---|
| 5,283,829 A | | 2/1994 | Anderson ..................... 380/24 |
| 5,287,270 A | | 2/1994 | Hardy et al. ................. 364/408 |
| 5,326,959 A | | 7/1994 | Perazza ....................... 235/379 |
| 5,383,113 A | | 1/1995 | Kight et al. ................. 364/408 |
| 5,465,206 A | * | 11/1995 | Hilt et al. ....................... 705/40 |
| 5,572,438 A | * | 11/1996 | Ehlers et al. ................ 364/492 |
| 5,577,169 A | * | 11/1996 | Prezioso ...................... 395/61 |
| 5,649,117 A | * | 7/1997 | Landry ......................... 705/40 |
| 5,699,528 A | | 12/1997 | Hogan ........................ 395/240 |
| 5,717,989 A | * | 2/1998 | Tozzoli et al. ................ 705/37 |
| 5,799,289 A | * | 8/1998 | Fukushima et al. ......... 705/400 |
| 5,832,460 A | | 11/1998 | Bednar et al. ................ 705/27 |
| 5,842,185 A | | 11/1998 | Chancey et al. .............. 705/40 |
| 5,873,072 A | | 2/1999 | Kight et al. ................. 705/40 |
| 5,893,080 A | | 4/1999 | McGurl et al. ............... 705/40 |
| 5,903,830 A | * | 5/1999 | Joao et al. ................... 455/406 |
| 5,920,847 A | * | 7/1999 | Krollong et al. .............. 705/40 |
| 5,920,848 A | * | 7/1999 | Schutzer et al. .............. 705/42 |
| 5,930,773 A | * | 7/1999 | Crooks et al. ................ 705/30 |
| 5,956,700 A | | 9/1999 | Landry ........................ 705/40 |
| 6,006,193 A | * | 12/1999 | Gibson et al. ................ 705/8 |
| 6,029,144 A | * | 2/2000 | Barrett et al. ................ 705/30 |
| 6,032,133 A | | 2/2000 | Hilt et al. ..................... 705/40 |
| 6,035,285 A | * | 3/2000 | Schlect et al. ................ 705/30 |
| 6,052,450 A | * | 4/2000 | Allison et al. .............. 379/127 |
| 6,052,671 A | * | 4/2000 | Crooks et al. ................ 705/34 |
| 6,058,380 A | * | 5/2000 | Anderson et al. ............. 705/40 |
| 6,088,688 A | * | 7/2000 | Crooks et al. ............. 705/412 |
| 6,105,007 A | * | 8/2000 | Norris ......................... 705/38 |
| 6,151,588 A | * | 11/2000 | Tozzoli et al. ............... 705/37 |

SYSTEM AND METHOD FOR ELECTRONICALLY PROCESSING INVOICE INFORMATION

This application is a continuation application of Ser. No. 08/569,746, filed Dec. 8, 1995, now U.S. Pat. No. 6,058,380.

REFERENCE TO MICROFICHE APPENDIX

A microfiche appendix is included in this application consisting of 7 pages of microfiche and 350 frames.

TECHNICAL FIELD

The present invention relates to financial electronic data interchange ("EDI") technology and, more particularly, to a system and method for electronically processing invoice information.

BACKGROUND

The traditional manual methods of collecting, reviewing and paying vendors' invoices, especially periodic invoices, e.g., utility bills, are fraught with problems for customers having large volumes of such invoices. These problems include: (1) Failure to get the invoices through the customer's review, approval and accounts payable ("AP") process in time to avoid late notices, late payment fees and service shut-off; (2) inability to properly review the invoices for accuracy, e.g., comparing current charges to those of prior invoices, because such a review would be too costly and/or cumbersome, resulting in billing errors that may never be found; (3) unwillingness of employees of the customer, e.g., store and branch managers, to give the review process a high priority or to put much time into the review process because review is considered to be tedious, resulting in invoices that are unduly held up or not properly reviewed; (4) use of AP operations staff to review invoices, resulting in a labor-intensive and, therefore, costly review process; and (5) a frequent necessity to review invoices only after payment has already been made.

Recently, several types of vendors, e.g., utility companies, lessors of commercial property, and uniform providers, have begun to use an EDI invoice that complies with the ASC X.12 810 standard ("810 Invoice"). The telephone industry has begun to use an EDI invoice that complies with the ASC X.12 811 standard ("811 Invoice"). These electronic invoices contain the same information as do analogous paper invoices, but the information is electronically transmitted via a network from the vendor's computer system to a remote computer in a standardized format.

Further, various vendors are beginning to accept payment for bills in an EDI format that complies with the ASC X.12 820 standard ("820 Payment"). This electronic payment contains all of the payment information that a customer would include on a conventional AP check and stub, e.g., payer name, amount, invoice number, account number and dates. A vendor's bank can receive an 820 Payment and automatically post the receivable to the vendor's accounting system, almost instantaneously. Many customers of such vendors, however, do not have EDI capabilities.

There is a strong need in the banking industry for a system that will permit a financial intermediary to automatically process in an efficient and timely manner invoice information from a vendor on behalf of the vendor's customers. Such a system should take advantage of financial EDI technology, which allows companies to exchange payments and related data with trading partners using the Automated Clearinghouse ("ACH") or private EDI networks. Several banking institutions have distributed marketing materials that make reference to various invoice processing services, which are purported to be either currently available or in the development stage. However, the applicants are unaware of any currently-existing invoice processing system that takes full advantage of current EDI technology and provides automated pre-approval of invoices.

SUMMARY OF THE INVENTION

The current invention provides a system and a method that permits an intermediary, e.g., a bank, having EDI capabilities to electronically process vendor invoice information on behalf of a customer that does not have EDI capabilities. A system for processing invoice information is disclosed. The system includes means for communicating invoice information from a vendor site to an intermediary site and means for performing an automated reasonability test on the invoice information at the intermediary site using a reasonability criterion. A method is also disclosed, in which the invoice information is communicated from a vendor site to an intermediary site and an automated reasonability test is performed on the invoice information at the intermediary site using a reasonability criterion.

Using the present invention, an intermediary can (1) receive invoice information by any of a variety of methods, including electronic, from a vendor on behalf of a customer; (2) automatically review the invoice information, resulting in either approval of the invoice information or identification of unusual billing circumstances; (3) notify the customer of any unusual billing circumstances; (4) electronically transmit a file to the customer that is compatible with customer's AP system; (5) pay the vendor by any of a variety of methods, including electronic, on the due date; and (6) maintain historical information, which permits trends analysis and management reporting.

The advantages of the present invention over conventional systems and techniques are numerous and include the following: (1) A shorter and more manageable time line between invoicing and payment by replacing three mail cycles (vendor to customer, customer to AP department and AP department to vendor) with faster electronic cycles; (2) a reduction in invoice costs through elimination of late and finance charges, resulting from an increase in invoice payment accuracy and timeliness; (3) a reduction in customer's AP staff resource costs through automation, e.g., automated update of AP system, which obviates manual data entry; (4) automated review of invoices, which permits the customer to solely focus on problem invoices; (5) automated auditing of invoices, e.g., for computation accuracy and rate classification; and (6) management reporting capabilities, e.g., energy management for utility customers.

DESCRIPTION OF THE PREFERRED EMBODIMENT

I. Distributed Embodiment

In a first embodiment, the present invention employs a distributed architecture, in which a main intermediary database is maintained at the site of an intermediary and a separate customer database is maintained at each customer site. The main database contains information relating to all vendors and customers who utilize the system. Each customer database contains only information that is stored in the main database and pertains to that customer. The contents of the main database and the customer databases can be altered independently of each other. However, all databases must be synchronized so that changes made to a customer database is reflected in the main database and changes made to the main database are reflected in the appropriate customers' databases. This synchronization can be accomplished using techniques well-known in the art. The databases are maintained by a series of computer-implemented processes, i.e., computer programs. A series of data communication paths interconnect the processes and databases.

A. Invoice Collector

Multiple types of invoice information can be processed with the first embodiment, including (1) EDI invoices ("EDI Invoices"), e.g., both 810 Invoices and 811 Invoices; (2) electronic pre-authorized debits ("PADs"), e.g., ACH PPDs; and (3) traditional paper invoices.

Figure 1:
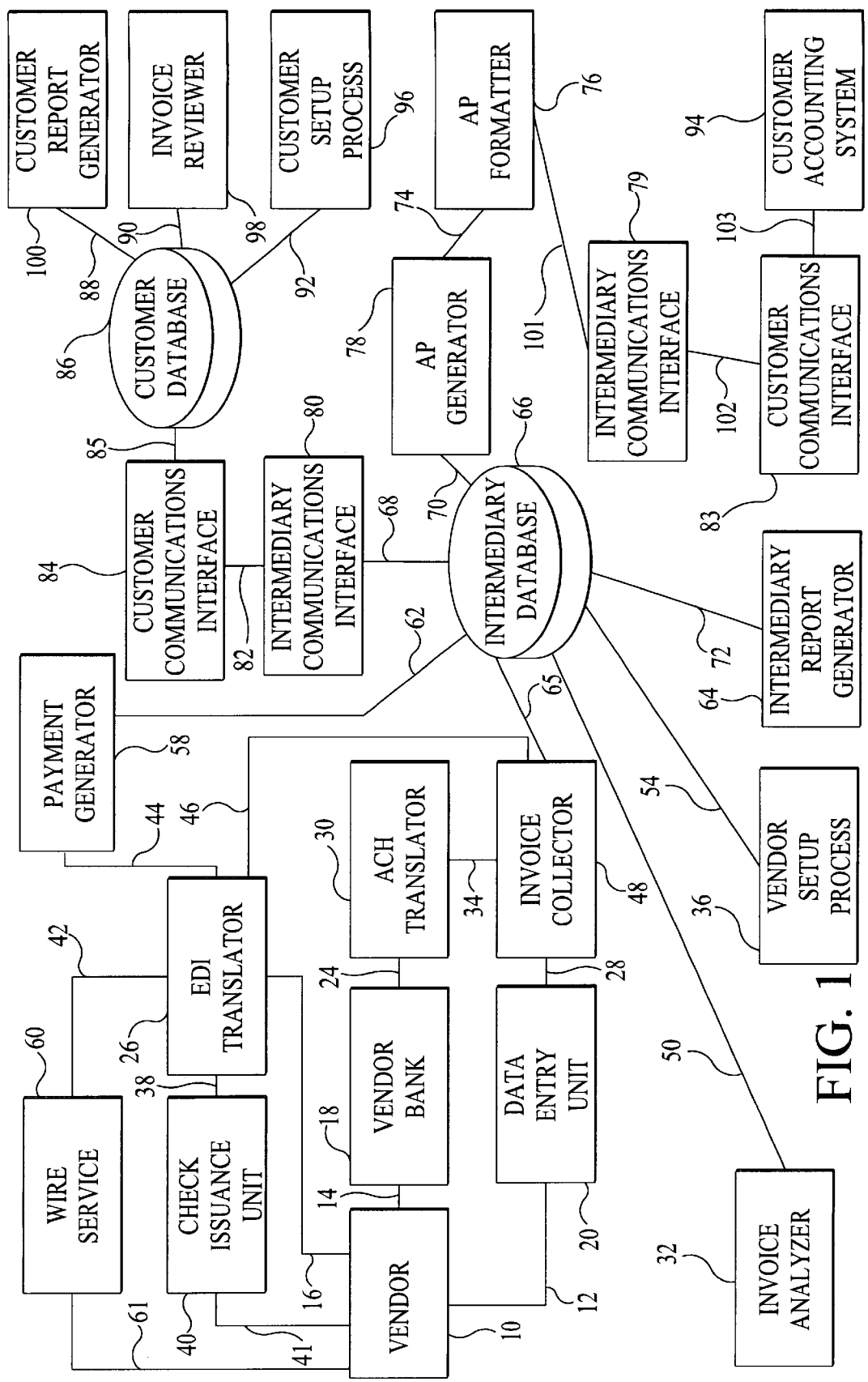
FIG. 1 is a data flow diagram, which depicts the flow of data among various manual processes, computer-implemented processes and data storage devices in a distributed embodiment of the present invention.

FIG. 1 depicts a data flow diagram for the first embodiment. Referring to FIG. 1, paper invoices are received by a data entry unit 20 from a vendor 10 via a traditional communication path 12, e.g., first-class mail. Upon receipt, data entry unit 12 manually converts the paper invoices into a flat file, which is communicated to an invoice collector 48 via a communication path 28, e.g., the internal bus of a mainframe. Invoice collector 48 extracts the invoice information from the flat file and stores the information in an intermediary database 66 via a communication path 65, e.g., the internal bus of a mainframe.

EDI Invoices are received by an EDI translator 26 from the vendor 10 via a communication path 16, e.g., a data communications network, in the form of an electronic file having an ANSI format. Transmission of the file via communication path 16 might entail transmitting the file from vendor 10 to its value-added network, if any, to an intermediary's value-added network, if any, and, then, to EDI translator 26 at designated times, e.g., on a daily basis. Upon receipt of the file, EDI translator 26 performs a syntax check on the invoices contained therein and sends an acknowledgment, e.g., an ASC X.12 997 functional acknowledgment, to the vendor 10 via communication path 16. The acknowledgment either indicates that the transmission was successful or that there were irregularities in connection with the transmission. If there were irregularities, the invoice is retransmitted. After the invoice is successfully transmitted, EDI translator 26 converts the ANSI-format invoice into a flat file, which is communicated to invoice collector 48 via a communication path 46, e.g., the internal bus of a mainframe. Invoice collector 48 extracts the invoice information from the flat file and stores the information in intermediary database 66 via communication path 65.

The vendor 10 communicates instructions via path 14 to vendor bank 18. PADs are received by an ACH translator 30 from the vendor bank 18 via a communication path 24 in the form of an electronic file. Transmission of the file via communication path 24 might entail transmitting the file over the ACH network on a periodic, e.g., daily, basis, which is an especially cost-effective way of transmitting financial information. See Bernard D. Reams, Jr., et al., Electronic Contracting Law 337-52 (1995–96 ed.). Unlike EDI Invoices, ACH PPD's must comply with strict invariant format requirements. Accordingly, a syntax check is unnecessary. However, PAD's must be converted from their ACH PPD format into a flat file format. Therefore, upon receipt of the ACH PPD file, an ACH translator 30 converts the PAD into a flat file, which is communicated to invoice collector 48 via a communication path 34, e.g., the internal bus of a mainframe. Invoice collector 48 extracts the PAD information from the flat file and stores the information in intermediary database 66 via communication path 65.

Hereinafter, the term "Electronic Invoices" is used to refer to EDI Invoices and PADs, collectively. In the claims, the term "invoice information" is used as a generic term that includes, but is not limited to, EDI Invoice information, PAD information and paper invoice information. Each of the paper invoices and Electronic Invoices (collectively "Invoices") is stored in a distinct record in an invoice table in intermediary database 66. Each record has an identifier that indicates the type of the Invoice, e.g., paper, EDI or PAD. Before an Invoice is stored in intermediary database 66, however, certain checks are performed to maintain the integrity or consistency of the data stored in intermediary database 66. For example, if a received Invoice does not include an invoice number, a unique invoice number is generated for the Invoice based on an algorithm, e.g., the account number plus designated date. All EDI Invoices are guaranteed to have an invoice number as part of the EDI transaction. Moreover, checks are made to ensure that the Invoice is associated with an existing account, that the Invoice has been received in the manner that the customer has specified for that account, that the Invoice is not a duplicate and that the vendor has sent all expected Invoices. If an exception is detected, action is taken in accordance with Table 1 and an exception report is generated in accordance with Table 2.

TABLE 1

| EXCEPTION | ACTION | RESPONSIBILITY |
| --- | --- | --- |
| Missing Account | Contact Vendor. Vendor must research with Customer to assure that setup is complete. | Intermediary for Vendor notification. Customer for setup. |
| Product Options Mismatch | Correct customer setup. | Customer |
| Duplicate Invoice | Review only/No action required. | Intermediary |
| A Vendor Not Reporting - Invoices were expected, but not received. | Research the receipt of input files/ Contact vendor. | Intermediary |

TABLE 2

| Report | Recipient | Originator |
| --- | --- | --- |
| Missing Account | Intermediary if all are missing; Customer if partial information is missing. | Automatic |
| Product Option Mismatch Report | Intermediary; Customer | Automatic |
| Duplicate Invoice Report | Intermediary | Automatic |
| Vendors Not Reporting | Intermediary | Automatic |

B. Invoice Analysis

An invoice analyzer 32 retrieves each Invoice that has yet to be analyzed from intermediary database 66 via a communication path 50, e.g., the internal bus of a mainframe. Invoice analyzer 32 evaluates each Invoice, e.g., by performing a reasonability check, and assigns a green, yellow or red status to the Invoice as to payment along with explanatory information, based upon analysis criteria that the customer has established for the account corresponding to the Invoice. Different criteria can be specified for different accounts of the same customer. Illustrative criteria and the corresponding status assignments are depicted in Table 3.

TABLE 3

| CATEGORY | CRITERIA | GREEN | YELLOW | RED |
| --- | --- | --- | --- | --- |
| Reasonability Check | Min/Max Absolute Dollar Amount | Within min/max of designated range. | Within min/max of designated range exclusive of "green" range. | Exceeds min/max of designated "yellow" range. |
| | Previous Month Amount Comparison $$$ | Within min/max of designated range | Within min/max of designated range exclusive of "green" range. | Exceeds min/max of designated "yellow" range. |
| | Previous Month Amount Comparison % | Within min/max of designated range | Within min/max of designated range exclusive of "green" range | Exceeds min/max of designated "yellow" range. |
| | Previous Month Units Comparison Units | Within min/max of designated range. | Within min/max of designated range exclusive of "green" range. | Exceeds min/max of designated "yellow" range. |
| | Previous Month Units Comparison % | Within min/max of designated range. | Within min/max of designated range exclusive of "green" range. | Exceeds min/max of designated "yellow" range. |
| | Historical Month Amount Comparison $$$ | Within min/max of designated range. | Within min/max of designated range exclusive of "green" range | Exceeds min/max of designated "yellow" range. |
| | Historical Month Amount Comparison % | Within min/max of designated range. | Within min/max of designated range exclusive of "green" range. | Exceeds min/max of designated "yellow" range. |
| | Historical Month Units Comparison Units | Within min/max of designated range. | Within min/max of designated range exclusive of "green" range | Exceeds min/max of designated "yellow" range. |
| | Historical Month Units Comparison % | Within min/max of designated range. | Within min/max of designated range exclusive of "green" range | Exceeds min/max of designated "yellow" range. |
| | Plan to Actual Amount | Within min/max of designated range | Within min/max of designated range exclusive of "green" range. | Exceeds min/max of designated "yellow" range. |
| Beginning Balance Verification | Beginning balance comparison with ending balance of immediate prior period. | Beginning balance equals ending balance of immediate prior period. | Beginning balance does not equal ending balance of immediate prior period. | Beginning balance does not equal ending balance of immediate prior period. |
| Prior Period Balance | Existence of a unpaid amount from the immediate prior period. | Prior period balance equals zero. | Prior period balance is greater than zero. | Prior period balance is greater than zero. |
| Beginning Meter Reading Verification | Beginning meter reading comparison with ending reading of immediate prior period. | Beginning reading equals ending reading of immediate prior period. | Beginning reading does not equal ending reading of immediate prior period. prior period. | Beginning reading does not equal ending reading of immediate |
| Pay Criteria Test | Charges other than for normal monthly service; deposits; late fees; repairs. | Pay with no notification | Pay with notification detailing expense | Do not pay with notification detailing expense |
| | Estimated vs. actual bill | Pay regardless of estimate/ actual bill. | Pay with notification of estimate bill | Do not pay with notification |

TABLE 3-continued

| CATEGORY | CRITERIA | GREEN | YELLOW | RED |
|---|---|---|---|---|
| | | | of estimate bill | |
| Date Check Test | Charges are incurred either prior to the opening of a unit or after the closing of a unit | Pay regardless of open/close date. | Pay with notification of inconsistent dates. | Do not pay with notification of inconsistent dates. |

Invoice analyzer 32 stores the updated Invoices in intermediary database 66 via communication path 50. Execution of invoice analyzer 32 follows completion of the Invoice collection process. Invoice analyzer 32 should encounter no exceptions because Invoices are processed only if all customer and account data is appropriately set up. After invoice analyzer 32 executes, the reports described in Table 4 should be available.

TABLE 4

| Report | Recipient | Originator |
|---|---|---|
| Pay Normal Invoices Report (Green Status) | Customer | Customer |
| Pay/Need to Review Report (Yellow Status) | Customer | Customer |
| Failed Invoice/ Pending Approval Report (Red Status) | Customer | Customer |
| Individual Invoice Detail Lookup | Customer | Customer |
| Cash Funding Report - Payment Due Date/ # Invoices Due/Total $$$ Amount Due | Customer | Customer |

C. Invoice Review and Approval

Customer-specific information stored in intermediary database 66 is synchronized with the information stored in a corresponding customer database 86 on a periodic basis, e.g., on a daily basis. In other words, new information stored in customer database 86 is copied to intermediary database 66, and new information stored in intermediary database 66 is copied to customer database 86. Synchronization can be accomplished by any of several well-known methods.

In the present embodiment, new data stored in intermediary database 66 is communicated to an intermediary communications interface 80 via communication path 68, e.g., an intermediary internal network. Intermediary communications interface 80 uploads the data to communication path 82, e.g., a public data communications network. A customer communications interface 84 then downloads the data from communication path 82 and stores the data in customer database 86 via communication path 85, e.g., a customer internal network. The uploading procedure is taken care of automatically by intermediary communications interface 80, and, therefore, the new data is ready for download by the customer anytime after invoice analyzer 32 executes. The customer must initiate this download procedure.

New data stored in customer database 86 is communicated to a customer communications interface 84 via communication path 85. Customer communications interface 84 uploads the data to communication path 82. The customer must initiate this upload. An intermediary communications interface 80 then downloads the data from communication path 82 after a customer-designated cutoff time on a periodic basis, e.g., on a daily basis, and stores the data in intermediary database 66 via communication path 68.

In this manner, the customer controls the synchronization of databases 66 and 86, with respect to invoice review and approval, through the execution of customer communications interface 84.

An invoice reviewer 98 retrieves each Invoice that has been processed by invoice analyzer 32, but not reviewed, from customer database 86 via a communication path 90, e.g., the internal bus of a personal computer ("PC"). Subsequently, invoice reviewer 98 displays each such Invoice in some manner, e.g. on a display screen, at which time the customer can enter directions for payment by reviewing and approving, modifying and approving, rejecting, or taking no action on each Invoice.

The customer can take appropriate action on each Invoice, based upon the status assigned to that Invoice. The customer can (1) approve any "red" Invoice, i.e., one that failed the Invoice analysis test; (2) modify, i.e., change the payment amount, any "green", "yellow" or "red" Invoice; (3) disapprove any "green", "yellow", or red Invoice, unless disapproved; (4) take no action on any "green", "yellow", or "red" Invoice, allowing payment action to occur as per Invoice status, i.e., "green" or "yellow" Invoices will be paid and "red" Invoices will not be paid (if a "red" Invoice is neither approved nor rejected by the due date, the Invoice continues to be reported on the pending approval report until approval or rejection takes place); (5) automatically approve all Invoices on the date of the Invoice, as specified in setup instructions; or (6) approve all Invoices per request on date of request.

Actions taken on each Invoice will be stored in customer database 86 via communication path 90. A customer can execute invoice reviewer 98 to take action on an Invoice or modify previous action taken on an Invoice, e.g., rejection of a formerly approved Invoice, during the period up to and including the date of payment. Invoices can be approved for payment after the payment due date, but such Invoices may be subject to late payment fees.

Optionally, invoice reviewer 98 can display the Invoices to the customer in an order designated by the customer during the setup process, e.g., according to status within vendor, status by oldest date, or status by most current date.

The customer can determine when to review Invoices by controlling the download of analyzed Invoices and the execution of invoice reviewer 98. The customer may initiate the download of analyzed Invoices. Once downloaded, the customer can decide when to review, by executing invoice reviewer 98, the most recently analyzed Invoices. Results of a review are stored in customer database 86 and, subsequently, uploaded for transmission to intermediary database 66 according to the synchronization process described at the beginning of this section. The upload is under the control of the customer. However, results can be periodically retrieved by the intermediary from intermediary communications interface 80. Any results that are retrieved after a designated cutoff time are stored in intermediary database 66.

A tickler process can be implemented to alert the customer, e.g., during the five business days prior to the payment due date, as to when no action has occurred for a "red" Invoice having a pending payment due. In general, reports are generated in accordance with Table 5.

TABLE 5

| Report | Recipient | Originator |
|---|---|---|
| Pending Approval Tickler | Customer | Customer |
| Prior Month Unsettled Customer | Customer | Customer |
| Reconcilement of End of Day Processing-details receipt/payment status of each Invoice through payment due date | Customer | Customer |
| Approved/Disapproved | Customer | Customer |
| Accounts Payable Summary | Customer | Customer |
| Accounts Payable Data Entry | Customer | Customer |

D. Payment Generation

On the payment date designated by the vendor or earlier, if specified by the customer during the setup process (see section I.I, below), all Invoices approved for payment, either by the system, i.e., those having green or yellow status, or by the customer review process, are paid in accordance with the instructions and in the manner designated by the customer during the setup procedure. Moreover, a payment notification will be transmitted to the customer for all items due on that date. The customer cannot take any action on a paid Invoice after this point. The effective due date can be modified by the customer during the setup process by specifying a number of buffer days to be added to or subtracted from the vendor's due date. Moreover, payments are issued far enough in advance of the effective due date to take into consideration the amount of time that it takes for a payment to clear, i.e., the number of float days, and, therefore, to ensure that payment clears by the effective due date.

Payment generator 58 retrieves those Invoices that are to be paid from intermediary database 66 via a communication path 62, e.g., the internal bus of a mainframe. Based upon the payment instructions designated during the setup procedures (see sections I.H and I.I, below), payment generator 58 formats, generates and transmits to the EDI translator 26 via a communication path 44, e.g., the internal bus of a mainframe, appropriate payment instructions. For example, the payment instructions might direct the generation of an EDI payment, e.g., an 820 Payment, to vendor 10 via communication path 16. If payment generator 58 indicates that no payment is to be made for a given Invoice, EDI translator 30 transmits either an 824 truncation, i.e., rejection, transaction or an 827 returned item transaction. EDI translator 26 either generates an ACH transaction or settles through EDIBANX, if the receiving bank is a member.

The present embodiment supports other types of payments, as well. For example, EDI translator 26 can transmit payment instructions via a communication path 38, e.g., the internal bus of a mainframe, to a check issuance unit 40, which issues a check in the appropriate amount and transmits the same to vendor 10 via a communication path 41, e.g., first-class mail. Alternatively, EDI translator 26 can transmit payment instructions via a communication path 42 to a wire service 60, which wires the appropriate amount to vendor 10 via a communication path 61. PADs, of course, require no action other than a payment notification because the payment process for PADs occurs outside of the scope of the present invention, i.e., prior to receipt of the PAD by the present embodiment.

EDI translator 26 can either generate one payment per Invoice or, alternatively, generate a payment for more than one Invoice by bundling payments.

After payment generator 58 transmits all payment instructions, it stores any payment status changes made to Invoices and accompanying information in intermediary database 66 via communication path 62. Payment generator 58 should execute after intermediary database 66 has been updated with the latest Invoice review results from the customer. In general, reports can be generated in accordance with Table 6.

TABLE 6

| Report | Recipient | Originator |
|---|---|---|
| Summary Transaction | Customer | Customer |
| Summary History | Customer | Customer |
| Cash Funding Report | Customer | Customer |
| Accounts Payable Summary | Customer | Customer |
| Accounts Payable Data Entry Form | Customer | Customer |
| Failure to Deliver Payment | Intermediary (will correct rejected items or notify customer on returned items) | Automatic |

E. Accounts Payable Generation

Based upon format instructions designated by the customer during the setup procedure, an AP generator 78 (1) retrieves appropriate Invoice payment information from intermediary database 66 via communication path 70, e.g., the internal bus of a mainframe; (2) therefrom generates a generically-formatted update file for the customer's AP system, either periodically or under specified conditions; and (3) transmits the update file to an AP formatter 76 via a communication path 74, e.g., the internal bus of a mainframe.

The customer can elect to have an AP update file generated at any of a number of points during Invoice processing, including: (1) Either (a) when the Invoice is received from the vendor so as to reflect appropriate accruals, with the file containing all "green" and "yellow" Invoices and it being the responsibility of the customer to update its AP system as the status or amount is changed for an Invoice or (b) when payment is made, with the file containing only Invoices having an approved status; and (2) at other additional times, based on nontraditional calendars, as specified by the customer during setup.

In general, reports are generated in accordance with Table 7.

TABLE 7

| Report | Recipient | Originator |
|---|---|---|
| General audit reports detailing anticipated activity vs. actual activity. | Intermediary | Automatic |
| Anticipated Activity- 5 business day forecast of | Intermediary | Automatic |

TABLE 7-continued

| Report | Recipient | Originator |
|---|---|---|
| activity scheduled to occur. "Today's" activity sorts to the top for immediate visibility | | |
| Past due items | Intermediary | Automatic |

F. Accounts Payable Formatter

AP formatter 76 receives via communication path 74 the generically-formatted update file that has been generated by AP generator 78 and converts the file into a file having an account-specific format that is compatible with a customer accounting system 94.

In the present embodiment, the account-specific file is communicated to an intermediary communications interface 79 via a communication path 101, e.g., an intermediary internal network. Intermediary communications interface 79 uploads the file to a communication path 102, e.g., a public data communications network. A customer communications interface 83 then downloads the data from communication path 102 and transmits the file to customer accounting system 94 via a communication path 103, e.g., a customer internal network. Customer accounting system 94 need not be located at the same site as is customer database 86. The account-specific format is specified by the customer for each account during the setup procedure.

The uploading procedure is taken care of automatically by intermediary communications interface 79, and, therefore, the new data is ready for download by the customer anytime after AP formatter 76 executes. The customer must initiate this download procedure. In this manner, the customer controls the flow of information into its customer accounting system 94 through the execution of customer communications interface 83.

AP formatter 76 executes immediately after AP generator 78 generates the generically-formatted AP update file. In general, reports can be generated in accordance with Table 8.

TABLE 8

| Report | Recipient | Originator |
|---|---|---|
| General audit reports detailing number of transactions and amounts for each Customer. | Intermediary | Intermediary |
| General audit reports detailing number of transactions and amounts for individual Customer. | Customer | Customer |
| Cross reference of data fields from Intermediary to Customer AP system | Intermediary | Intermediary |

G. History Maintenance

In the present embodiment, the records for each Invoice is maintained in intermediary database 66 for a set period, e.g., two years, from the time when the Invoice is received by the intermediary. The history forms the basis for future Invoice analysis and energy management analysis. All relevant information relating to the Invoice and the final disposition of the payment is maintained. Payment information for each Invoice is also maintained in customer database 86.

Purge criteria for both intermediary database 66 and customer database 86 can be established by parameters designated by the customer during the setup procedure. Purging of all databases 66 and 86 takes place periodically, at an interval specified by the customer. In general, reports are generated in accordance with Table 9.

TABLE 9

| Report | Recipient | Originator |
|---|---|---|
| General audit reports detailing purged activity. | Intermediary | Automatic |
| Cross-reference summary of Customer/ Vendors/Date ranges within purge cycle. | Intermediary | Automatic |
| General audit reports detailing purged activity. | Customer | Automatic |

H. Vendor Set-Up

Each customer provides the intermediary with the customer's vendor list. The intermediary acts as a facilitator between vendor 10 and the customer and assists in determining the desired parameters for Invoice processing. Once the parameters are obtained and verified, a vendor setup process 36 solicits the parameters from the intermediary and then stores the parameters in a vendor master file in intermediary database 66 via communication path 54, e.g., the internal bus of a mainframe. Some parameters may require verification by entities other than vendor 10, customer and intermediary, e.g., bank information, NACHA participation and transit routing numbers.

The vendor master file might include, but is not limited to, the following information: (1) vendor name; (2) vendor remittance address; (3) vendor identification number; (4) vendor type, e.g., gas, electric, telephone, leasing, or maintenance company; (5) bank account information, e.g., name of bank and account number; (6) individual contacts in various departments of vendor, e.g., EDI department and customer service department; (6) Invoice origination capabilities, e.g., paper, EDI, including version detail, and PAD; (7) payment receipt capabilities, e.g., check, EDI, including version detail and credit bank information, and ACH; and (8) general Invoice information, e.g., generation dates and grace periods for payment of Invoices.

The vendor master file can be updated at anytime by executing vendor setup process 36. In general, reports are generated in accordance with Table 10.

TABLE 10

| Report | Recipient | Originator |
|---|---|---|
| General audit reports detailing updates. | Intermediary | Automatic |
| Exception/error report | Intermediary | Automatic |

I. Customer/Account Setup

In the present embodiment, the customer is responsible for entering customer-specific information relating to its various vendors and accounts, including (1) the level of sophistication of reasonability checking; (2) reasonability checking criteria; (3) the methods of invoice receipt and payment elected for each of its vendors; and (4) any special payment agreements with the vendor, e.g., discounts.

A customer setup process 96 solicits this information from the customer and then stores the information in a file in customer database 86 via communication path 92, e.g., the internal bus of a PC, whereby the customer's information is updated. The customer can be responsible for defining the instruction default hierarchy, i.e., the relationship between the parameters specified for (1) the customer; (2) its various units, if any, e.g., stores, branches or sites; and (3) specific vendor accounts. In fact, the customer can define additional levels, e.g., a region level between the unit and customer levels. The customer may specify information globally at the customer level, but this information is overridden by conflicting information that is specified at any lower level, e.g., customer/vendor information may override customer information and account information may override customer/vendor information, unless otherwise specified by the customer. This override capability is especially useful for certain parameters, e.g., general ledger entry parameters and payment criteria.

The global customer information might include, but is not limited to, the following: (1) name and identification number; (2) contact information; (3) address; (4) telephone number; (5) notes, i.e., historical information; (6) transmission protocol; (7) bank information; (8) AP system information, e.g., package/custom formats, update frequency and timing options; (9) vendor name; (10) vendor identification number; (11) vendor address; (12) system instructions by vendor, e.g., (a) discounts, (b) buffer date, (c) check issuance buffer dates, (d) grace period, (e) payment terms, (f) prepay codes, (g) default for buffer days, (h) default GL codes, (i) automatic pay/automatic review default, (j) review parameters (defined in terms of green/yellow/red and pay/pay but note exception/no pay exception), (k) dollar/usage limits, (l) percentage limits and criteria, (m) amount minimum/maximum, (n) amount percentage minimum/maximum, (o) minimum/maximum comparison to prior periods (e.g., prior month/current year; same month/prior year), (p) minimum/maximum comparison to planned amounts and (q) identification of flags for other billing information criteria (repairs/equipment/etc.); and (13) method of payment.

The unit information might include, but is not limited to, the following: (1) identification and (2) address. The account information, which is vendor-specific, might include, but is not limited to, the following: (1) vendor identification; (2) account identification; (3) open date; (4) close date; (5) expected billing date; (6) Invoice receipt date; (7) meter information, e.g., meter numbers and vendor type identification; and (8) overrides.

The customer, unit and account information can be updated at any time by executing customer setup process 96. In general, reports are generated in accordance with Table 11.

TABLE 11

| Report | Recipient | Originator |
| --- | --- | --- |
| General audit reports detailing updates | Intermediary/Customer | Automatic |
| New Accounts/New Meter | Customer | Automatic |
| Exception/error report | Intermediary | Automatic |

L. Reports

Standard reports are available for both the customer and the intermediary. Intermediary report generator 64 generates reports by querying intermediary database 66 via a communication path 72, e.g., the internal bus of a mainframe, for appropriate information and then formatting that information into a report, which is displayed in some manner, e.g. on a display screen, to the intermediary. Intermediary report generator 64 can generate reports containing information about single or multiple customers. Moreover, intermediary report generator 64 can generate on an ad hoc basis reports containing information of vendor interest. In general, intermediary report generator 64 can retrieve any information contained in intermediary database 66, as needed.

Customer report generator 100 generates reports by querying customer database 86 via a communication path 88, e.g. the internal bus of a PC, for appropriate information and then formatting that information into a report, which is displayed in some manner, e.g., on a display screen, to the customer.

A partial listing of possible reports, in addition to those already enumerated in the above tables, is contained in Table 12.

TABLE 12

| REPORT DESCRIPTION | RECIPIENT | TIMING | ORIGINATOR |
| --- | --- | --- | --- |
| Error Reports- e.g. Companies not processed | Intermediary | At any interval | Automatic |
| Monitor Reports - files that have been picked up or are pending. | Intermediary | At any interval | Automatic |
| Early Warning | Intermediary/Customer | At any interval | Automatic |
| Account Number Changes | Intermediary/Customer | At any interval | Automatic |
| Audit Report of all Updates and Actions | Intermediary/Customer | At any interval | Automatic |
| Status on Pending Actions (approval/disapproval) etc. | Intermediary/Customer | At any interval | Automatic |
| Reconcilement end-of-day | Intermediary/Customer | End of day processing-details receipt/payment status of each Invoice through payment due date | Automatic |

TABLE 12-continued

| REPORT DESCRIPTION | RECIPIENT | TIMING | ORIGINATOR |
|---|---|---|---|
| Rate Change Notification | Customer | Upon occurrence | Automatic |
| Rate Schedule Reporting | Customer | At any interval | Automatic |
| Rate Schedule Change Notification | Customer | Upon occurrence | Automatic |
| Energy Management | Customer | At any interval | Automatic |

M. Data Structure

Figure 2:
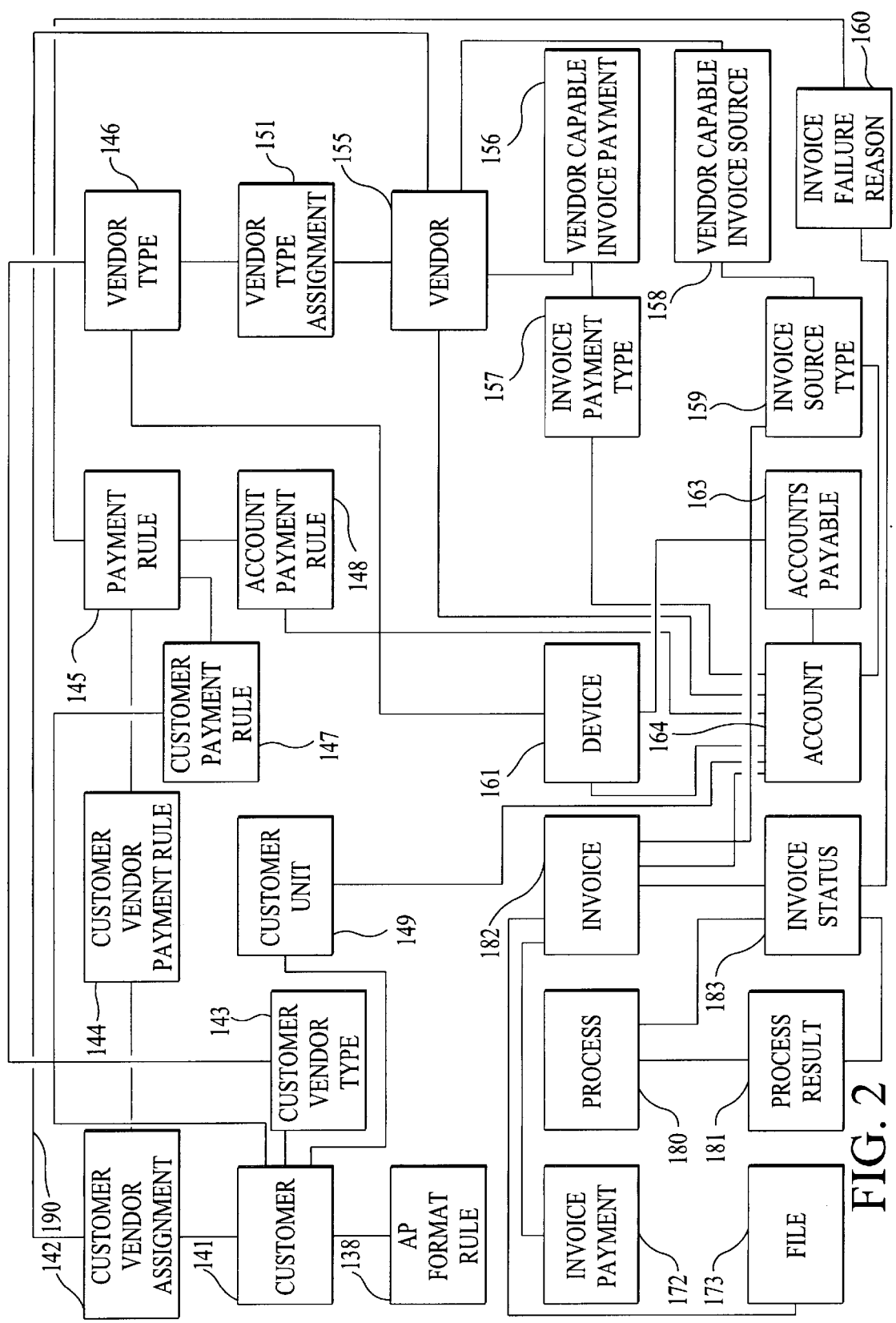
FIG. 2 is a data structure diagram for a distributed embodiment of the present invention.

The information stored in the intermediary database 66 and the customer databases 86 can be stored in any of a variety of ways. FIG. 2 depicts one way in which the data might be organized to facilitate execution of the processes described in sections I.A. through I.L., above. Referring to FIG. 2, each box therein represents a separate table in a relational database. Each table contains information about a particular type of entity that is part of the system, e.g., Invoices, with each entry or row in the table corresponding to a particular instance of that entity type, e.g., one particular Invoice. Each table has a series of attributes or column headings, which are assigned values for each entry in the table. For example, an Invoice table might have a date of receipt attribute, an amount attribute, and a file identification number attribute, which identifies the file from which a particular Invoice was received. Accordingly, each entry in the Invoice table would have a corresponding date of receipt, amount, and file identification number.

Some of the attributes act as keys into the table, i.e., the table, e.g., an Invoice table, can be searched for those entities, e.g., Invoices, having a key attribute, e.g., Invoice receipt date, with a specified value, e.g., Mar. 12, 1995. A table is searched by querying the table for all entries that have one or more key entries with specified corresponding values. The query is specified using a conventional query language, which typically utilizes boolean logic expressions. The result of the query is a subset of the set of all entries stored in the table. In the Invoice table example, all Invoices received on Mar. 12, 1995 should be returned.

Where two tables share at least one common attribute, values for that attribute retrieved from a first table can be used as a key into the second table, i.e., can be used to query the second table for entities that possess the same value for this key attribute. For example, the first table might be an Invoice table and the second table a file table having a file identification number attribute and a file name attribute. If a query of the Invoice table for those Invoices having a receipt date of Mar. 12, 1995 returns an Invoice having a corresponding file identification number, this file identification number can be used as a key into the file table to retrieve the name of the file in which that Invoice was received. Such key attributes can be used to establish links between the various tables that constitute a relational database, which permits a complex set of data to be stored and subsequently accessed in a convenient and logical manner.

Referring to FIG. 2, each table has at least one link 190, which emanates from the table and connects it to another table in the database. The existence of link 190 between two tables indicates that the two tables share at least one common attribute that is used to define a relationship between the two tables. Accordingly, each table is connected to at least one other table that contains related information, which can be accessed via link 190.

A customer table 141 contains an entry for each customer that utilizes the system to process its Invoices. A customer vendor assignment table 142 contains a mapping of the various vendors utilized by each customer. A customer unit table 149 contains a mapping of the various units associated with each customer.

A vendor table 155 contains an entry for each vendor whose Invoices are processed by the system. A customer vendor type table 143 contains a listing of the types of vendors for each occurrence of a vendor/client relationship. A vendor type table 146 contains an entry for each possible type of vendor whose Invoices are processed by the system, e.g., electric utility company or water company. A vendor type assignment table 151 specifies the type of each vendor. An invoice payment type table 157 contains an entry for each possible method of payment, e.g., EDI or check. A vendor capable invoice payment table 156 specifies the types of payments that each vendor is capable of receiving. An invoice source type table 159 contains an entry for each possible method of transmitting an Invoice, e.g., EDI or first-class mail. A vendor capable invoice source table 158 specifies the Invoice transmission methods of which each vendor is capable.

An account table 164 contains an entry for each account that is Invoiced under the system. Each customer may have multiple units, e.g., branches, with each unit having multiple accounts with each of multiple vendors. A device table 161 specifies the devices, e.g., the meters if the vendor is an electric utility company, associated with each account. Each account may have one or more devices associated with it.

An invoice table 182 contains an entry for each Invoice that has been received by the system. An invoice payment table 172 contains an entry for each payment that has been generated pursuant to an Invoice. A file table 173 contains an entry for each Invoice-containing file that has been received by the system and an entry for each payment-containing file that has been generated by the system. An invoice status table 183 contains an entry for each execution of a process that has resulted in a change of status for an Invoice. A process table 180 contains an entry for each system process that is capable of changing the status of an Invoice. A process result table 181 contains an entry for each of the possible process results that can lead to an Invoice status change. An invoice failure reason table 160 contains an entry for each explanation of why an Invoice has been assigned either a red or yellow status, i.e., a failed status.

A payment rule table 145 contains an entry for each payment criterion, including reasonability criteria, that has been specified by any customer. A customer payment rule table 147 specifies the particular payment criteria that are associated with each customer. A customer vendor payment rule table 144 specifies the particular payment criteria that are associated with particular vendors of each customer. Payment criteria specified for specific vendors override the default payment criteria specified for the corresponding customer. An account payment rule table 148 specifies the particular payment criteria that are applicable for each account. Payment criteria specified for specific accounts override the default payment criteria specified for the corresponding customer and/or vendor.

An AP format rule table 138 contains an entry for each format rule that has been specified for the generation of customer-specific AP feeds. An accounts payable table 163 contains an entry for each general ledger entry that is made for each account.

When each of the above-described processes executes, it updates appropriate tables in the relational database. Referring to FIGS. 1 and 2, invoice collector 48 updates invoice table 182, account table 164, invoice status table 183, process table 180, process result table 181, and file table 173. Invoice analyzer 32 updates invoice table 182, invoice status table 183, payment rule table 145, customer payment rule table 147, customer vendor payment rule table 144, account payment rule table 148, invoice failure reason table 160, invoice status table 183, process table 180, process result table 181, and file table 173. Invoice reviewer 98 updates invoice table 182, invoice status table 183, process table 180, process result table 181, and file table 173.

Payment generator 58 updates invoice table 182, invoice payment table 172, and file table 173. AP generator 78 updates accounts payable table 163, customer table 141, and device table 161. AP formatter 76 updates AP format rule table 138. Vendor setup process 36 updates vendor table 155, vendor type table 146, vendor type assignment table 151, invoice payment type table 157, vendor capable invoice payment table 156, invoice source type table 159, and vendor capable invoice source table 158. Customer setup process 96 updates customer table 141, customer unit table 149, account table 164, and device table 161.

Entries in invoice table 182, account table 164, invoice payment table 172, invoice failure reason table 160, and file table 173 are purged on a periodic basis, as specified by the customer during the customer setup process. History maintenance is accomplished by having an entry date attribute for each of these tables and by using that entry date during the purge process to only purge entries that were entered before the cutoff date of the purge.

Intermediary database 66, as depicted in FIG. 1, would store all of the tables depicted in FIG. 2, including every entry, regardless of the vendor or customer to which it pertains. Further, each customer database 86 would store all of the tables depicted in FIG. 2. However, customers could be denied access to certain of the databases, e.g., vendor table 155, for security reasons, e.g., to prevent the customer from altering the information contained therein. Moreover, each customer database 86 would only store those table entries that pertain to that particular customer.

N. Hardware Platform

Figure 3:
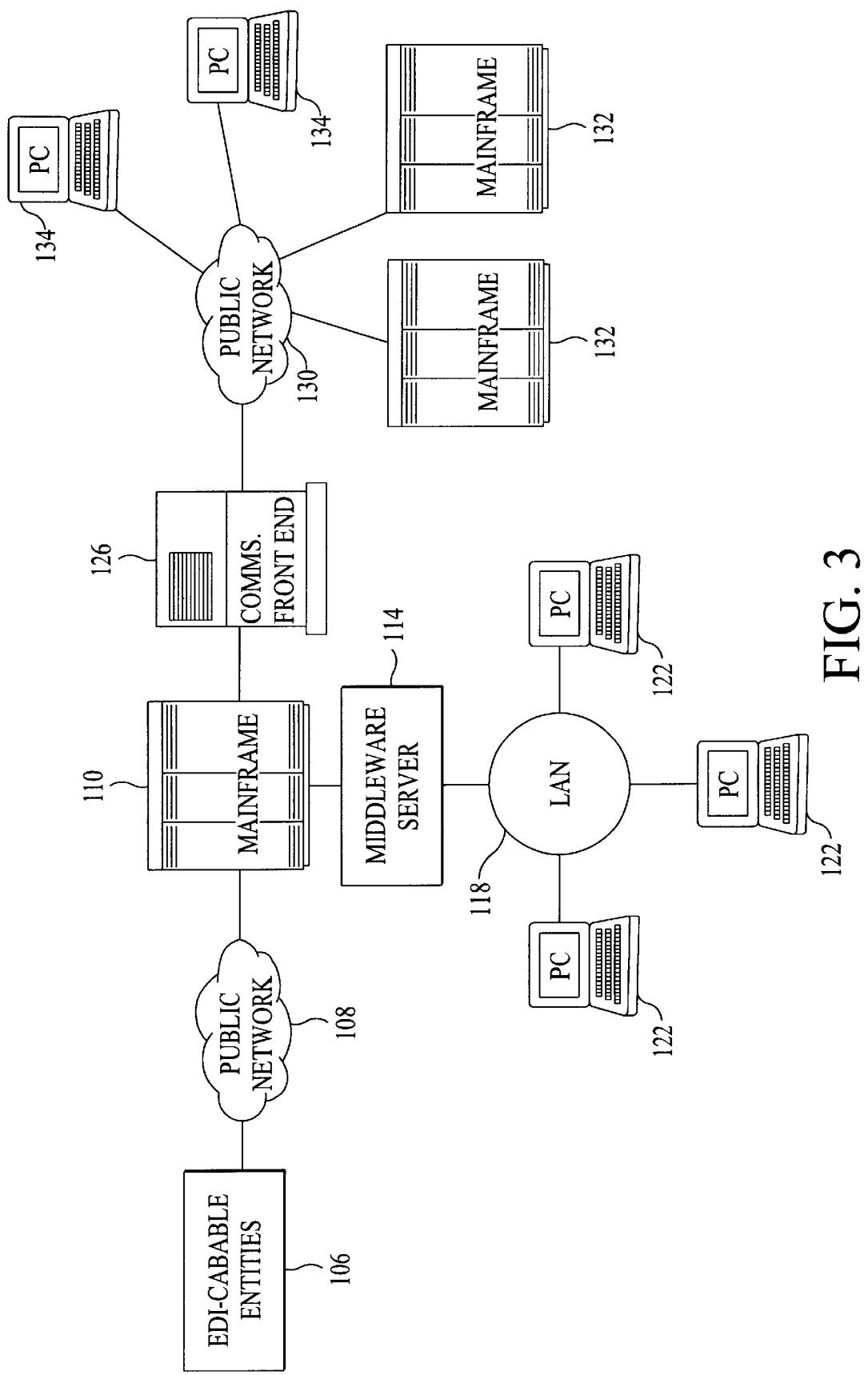
FIG. 3 is a schematic of a hardware platform for a distributed embodiment of the present invention.

The present embodiment can be implemented on any of a variety of hardware platforms. FIG. 3 depicts one such hardware platform. Referring to FIGS. 1 and 3, the following processes, as depicted in FIG. 1, are executed on a mainframe 110, as depicted in FIG. 3: (1) check issuance unit 40, (2) data entry unit 20, (3) EDI translator 26, (4) ACH translator 30, (5) payment generator 58, (6) invoice collector 48, (7) invoice analyzer 32, (8) vendor setup process 36, (9) intermediary report generator 64, (10) AP generator 78, and (11) AP formatter 76. Also, intermediary database 66, as depicted in FIG. 1, resides on mainframe 110, as depicted in FIG. 3. Accordingly, communication paths 28, 38, 44, 46, 50, 54, 62, 65, 70, 72 and 74, as depicted in FIG. 1, comprise the internal data bus of mainframe 110, as depicted in FIG. 3.

The intermediary can execute the processes residing on mainframe 110 by utilizing intermediary PCs 122 as input/output devices, which are connected to a local-area network ("LAN") 118. LAN 118 is connected to a middleware server 114, which establishes connectivity between a PC platform and a mainframe platform by translating communications between the two platforms in such a manner that the PC can treat the mainframe as another PC and the mainframe can treat the PC as another mainframe. Middleware server 114 is connected to mainframe 110.

Mainframe 110 receives from and transmits to EDI-capable entities 106 EDI communications via public network 108. EDI-capable entities 110 in FIG. 3 correspond to vendor 10 and vendor bank 18 in FIG. 1. Public network 108 in FIG. 3 corresponds to communication paths 16 and 24 in FIG. 1.

Finally, mainframe 110 is connected to a communications front end 126, which is responsible for acting as a host to communications software and for providing a safe storage area for files that are to be transmitted or have been received via a public network. Intermediary communications interface 80, as depicted in FIG. 1, is executed on communications front end 126, as depicted in FIG. 3. Communication path 68, as depicted in FIG. 1, comprises the communication link between mainframe 110 and communications front end 126, as depicted in FIG. 3.

Communications front end 126 is connected to individual customer PCs 134 via public network 130. Public networks 108 and 130 may be different or the same public networks. Users of customer PCs 134 access public network 130 by utilizing an appropriate dial-up number. Public network 130 in FIG. 3 corresponds to communication path 82 in FIG. 1. The following processes, as depicted in FIG. 1, are executed on customer PCs 134, as depicted in FIG. 3: (1) customer report generator 100, (2) invoice reviewer 98, (3) customer setup process 96, and (4) customer communications interface 84. Also, customer databases 86, as depicted in FIG. 1, reside on customer PCs 134, as depicted in FIG. 3. Accordingly, communication paths 85, 88, 90, and 92, as depicted in FIG. 1, comprise the internal data bus of customer PCs 134, as depicted in FIG. 3.

Communications front end 126 is also connected to individual customer mainframes 132 via public network 130. Although FIG. 3 depicts the use of the same pulic network 130 for communications both between intermediary communications front end 126 and customer PCs 134 and between intermediary communications front end 126 and customer mainframes 132, the public networks, generally, may be different. Users of customer mainframes 132 access public network 130 by utilizing an appropriate dial-up number. Public network 130 in FIG. 3 corresponds to communication path 102 in FIG. 1. The following processes, as depicted in FIG. 1, are executed on customer mainframes 132, as depicted in FIG. 3: (1) customer communications interface 83 and (2) customer accounting system 94. Accordingly, communication path 103, as depicted in FIG. 1, comprises the internal data bus of customer mainframes 132, as depicted in FIG. 3.

II. Non-Distributed Embodiment

Figure 4:
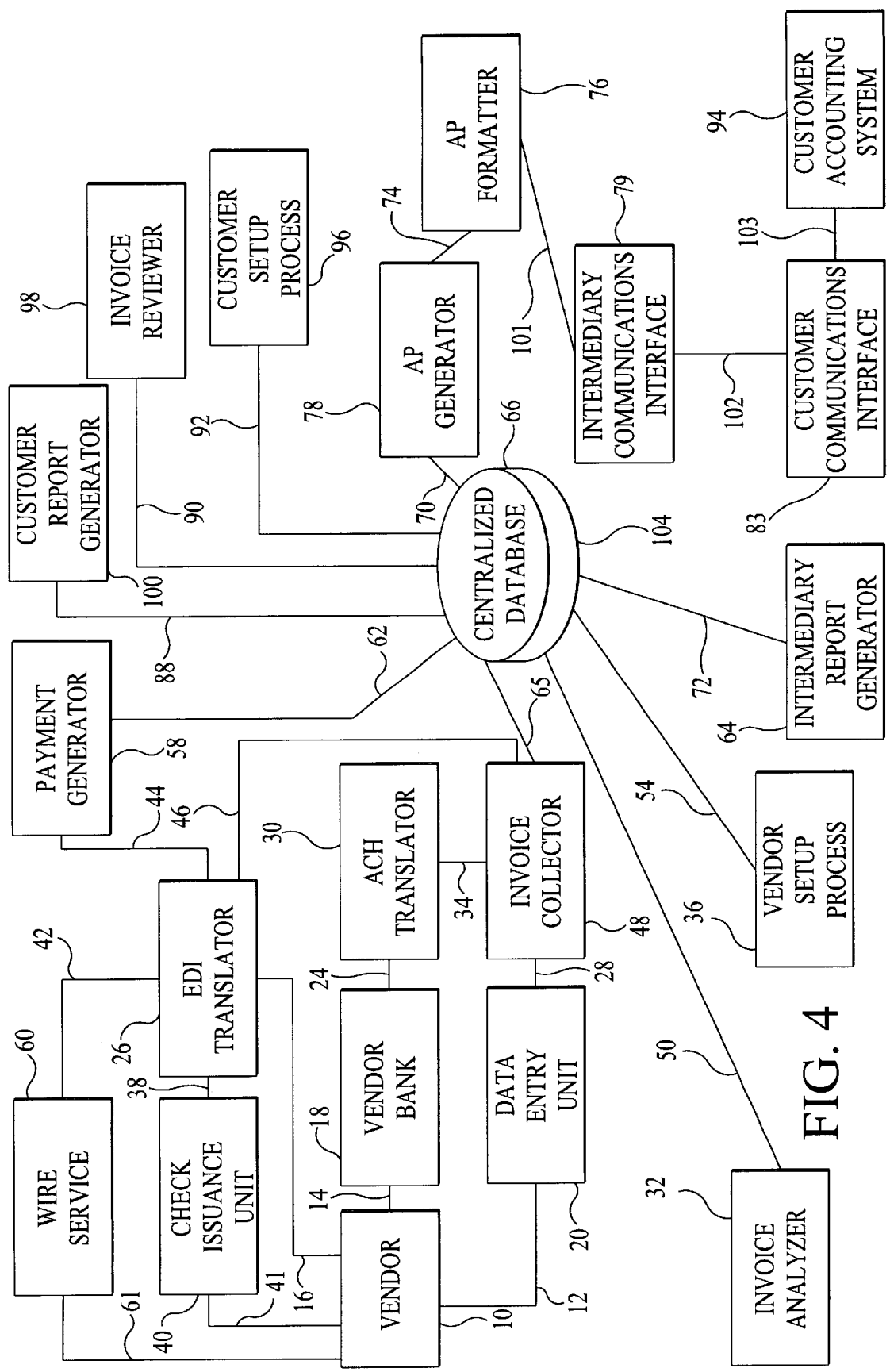
FIG. 4 is a data flow diagram, which depicts the flow of data among various manual processes, computer-implemented processes and data storage devices in a non-distributed embodiment of the present invention.

In a second embodiment, the present invention employs a non-distributed architecture, in which the intermediary database 66, customer databases 86, communication paths 68, 82 and 85, and communications interfaces 80 and 84 of FIG. 1 are replaced with a single centralized database 104, as depicted in FIG. 4. In such a non-distributed embodiment, communication paths 88, 90 and 92 should support inter-site communications. For example, analyzed invoices might be communicated to invoice reviewer 98 by first-class mail, telephone, fax or a public data communications network. In other respects, the non-distributed embodiment could function in substantially the same way as the distributed embodiment as described in section I, above. The source code listing for a non-distributed embodiment of the present invention that was designed to process only 810 Invoices is attached hereto as Microfiche Appendix A and is hereby incorporated by reference thereto as if set forth in its entirety. The source code listing for a non-distributed embodiment of the present invention that was designed to process only PADs is attached hereto as Microfiche Appendix B and is hereby incorporated by reference thereto as if set forth in its entirety. Both source code listings are written in the Microsoft Access™ high-level language.

In all of its presently-described embodiments, the invention supports the capture, analysis and subsequent payment by an intermediary of periodic electronic Invoices issued by vendors to customers. The vendor could be a utility company and the customer and intermediary could be separate entities, namely, a company having stores or branches at multiple sites and a financial institution, respectively. However, the present invention is applicable to any type of Invoice, whether or not periodic, and to all types of vendors, intermediaries and customers. Moreover, the invention is applicable to arrangements in which there is a single customer and the intermediary and customer are the same entity, i.e., the customer uses the invention to capture, analyze and subsequently pay the Invoices, without intervention by an intermediary.

Figure 5:
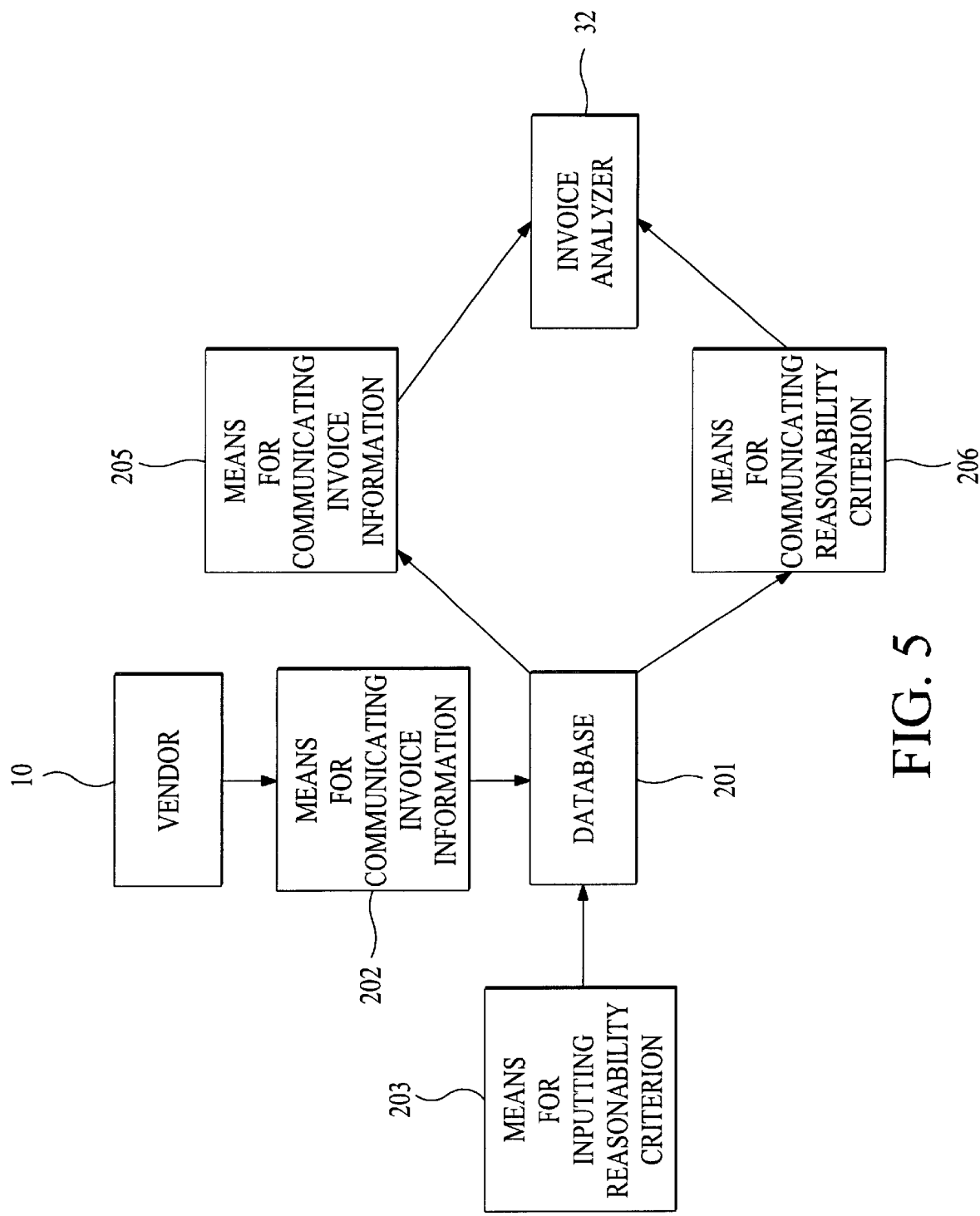
FIG. 5 is a generalized data flow diagram, which depicts the flow of data in a generalized process.

FIG. 5 depicts the flow of data in a generalized system for processing invoice information or billing data from a vendor 10 comprising an automated invoice analyzer 32 for analyzing invoice information, a database 201 for storing customer-specific information, means 202 for communicating invoice information from the vendor 10 to the database 201, means 203 for inputting a reasonability criterion into said database 201, means 205 for communicating said invoice information from said database 201, and means 206 for communicating said reasonability criterion from the database 201 to the invoice analyzer 32.

Figure 6:
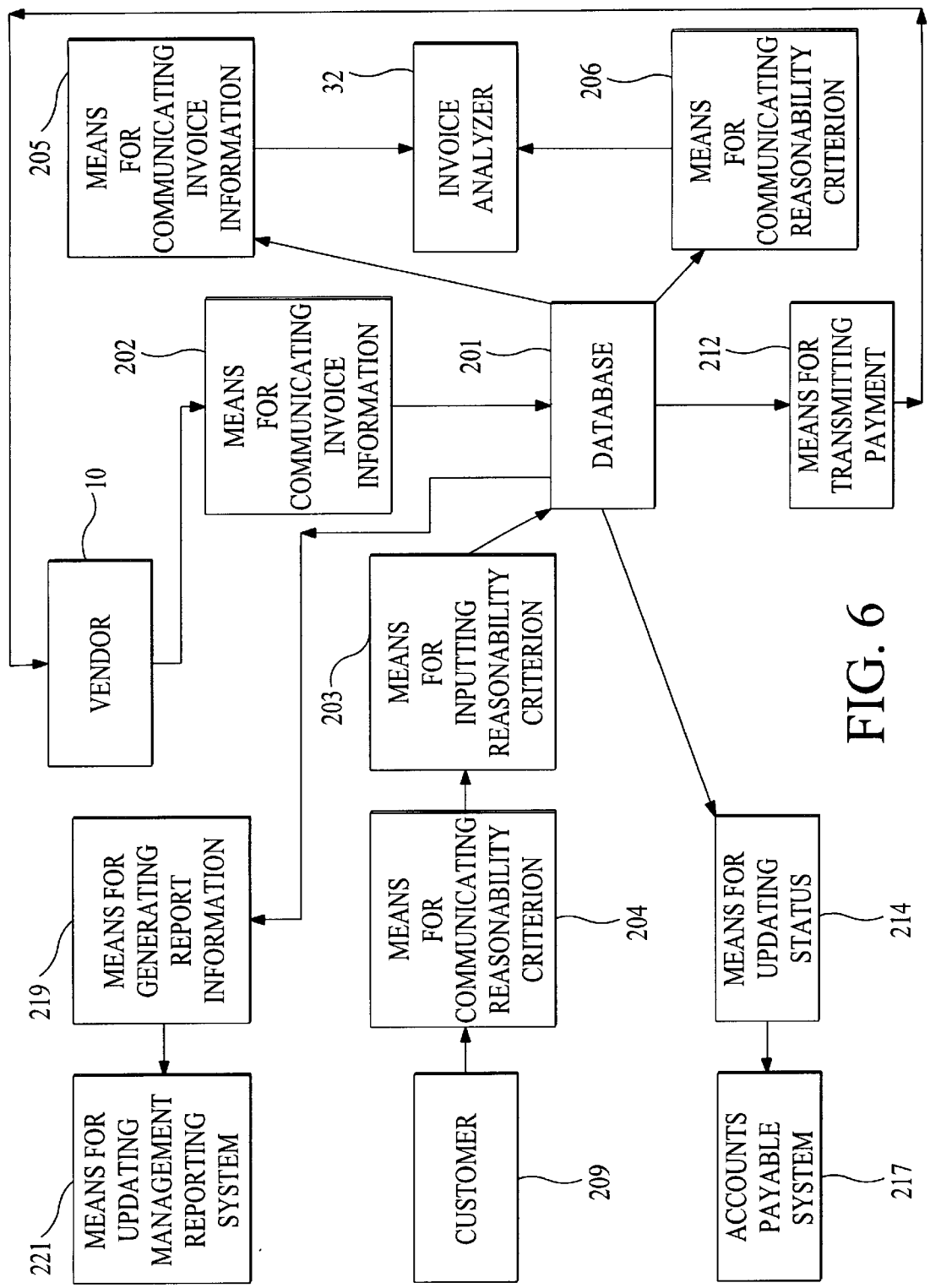
FIG. 6 is a more detailed generalized data flow diagram, which depicts the flow of data in a generalized process.

FIG. 6 depicts the flow of data in a generalized system for processing information having the flow of data depicted in FIG. 5 and further including means 204 for communicating a reasonability criterion from the customer 209, means 212 for transmitting payment to the vendor, means 214 for updating the status of the accounts payable system 217, means 219 for generating report information, and means 221 for updating the management reporting system.

The monograph referenced herein is hereby incorporated by reference thereto as if set forth in its entirety. Although we have illustrated and described a present preferred embodiment of the invention and variations thereon, the invention is not limited thereto but may be embodied otherwise within the scope of the following claims.

We claim:

1. A system for processing information, comprising:
   means for communicating billing data from a first site to a second site;
   means for communicating a reasonability criterion, said reasonability criterion comprising billing data analysis parameters; and
   means for performing an automated reasonability test on the billing data using the reasonability criterion.

2. The system of claim 1, wherein the billing data comprises an electronic form of billing data.

3. The system of claim 1, wherein the billing data comprises an electronic pre-authorized debit.

4. The system of claim 1, wherein the billing data communication means comprises a communications network.

5. The system of claim 1, wherein the billing data communication means comprises:
   means for communicating an electronic form of billing data from the first site to the second site.

6. The system of claim 1, wherein the billing data communication means comprises:
   means for communicating a paper form of billing data from the first site to the second site.

7. The system of claim 1, wherein the test means comprises a computer program residing on a computer and operating on a data storage means that contains the reasonability criterion.

8. The system of claim 1, wherein the reasonability criterion comprises a criterion selected from the group consisting of late charges, rate changes, unusually high or low invoice amounts, and unusually high or low usage amounts.

9. The system of claim 1, wherein the billing data corresponds to a business.

10. The system of claim 1, wherein the billing data corresponds to an individual consumer.

11. The system of claim 1, further comprising means for generating instructions regarding payment responsive to the results of the reasonability test.

12. The system of claim 1, further comprising means for transmitting a payment.

13. The system of claim 1, further comprising:
    means for communicating a pre-authorized debit to the second site.

14. The system of claim 1, further comprising:
    means for communicating the results of the reasonability test to a third site.

15. The system of claim 14, further comprising:
    means for communicating directions as to payment from the third site to a fourth site.

16. The system of claim 1, further comprising:
    means for generating financial information regarding the billing data; and
    means for communicating the financial information to a third site.

17. The system of claim 16, further comprising means for converting the financial information into a customer-specific format prior to communicating the financial information to the third site.

18. The system of claim 1, further comprising:
    means for communicating the results of the reasonability test to a third site; and
    means for storing the results.

19. The system of claim 18, further comprising:
    means for communicating directions as to payment from the third site to a fourth site.

20. The system of claim 19, further comprising means for storing the billing data wherein the means for communicating the results comprises a means for synchronizing the billing data storage means with the results storage means.

21. The system of claim 1, further comprising a centralized database comprising means for storing the results of the reasonability test.

22. The system of claim 21, wherein the centralized database is situated at the second site.

23. The system of claim 21, wherein the centralized database is situated at a third site.

24. The system of claim 1, further comprising means for storing the billing data.

25. The system of claim 24, wherein the billing data storage means comprises a database residing on a computer.

26. The system of claim 24, further comprising means for generating a report based on information retrieved from the billing data storage means.

27. The system of claim 26, wherein the report is a report selected from the group consisting of cash funding, pending approval, energy management, and historical trend.

28. The system of claim 1, further comprising means for transmitting a payment to a third site.

29. The system of claim 28, wherein the payment transmission means comprises a communications network.

30. The system of claim 28, wherein the payment transmission means comprises means for transmitting the an electronic payment.

31. The system of claim 28, wherein the payment transmission means comprises means for transmitting the payment via an electronic settlement system.

32. The system of claim 28, wherein the payment transmission means comprises means for bundling payments for a plurality of billing data into a single payment.

33. The system of claim 28, wherein the payment transmission means comprises:

means for transmitting payment instructions via an electronic messaging system.

34. A method of processing information, comprising the following steps:

communicating billing data from a first site to a second site;

communicating a reasonability criterion, said reasonability criterion comprising billing data analysis parameters; and performing an automated reasonability test on the billing data using the reasonability criterion.

35. The method of claim 34, further comprising the step of transmitting a payment to a third site, if the billing data passes the automated reasonability test.

36. The method of claim 34, further comprising the following steps:

communicating the results of the reasonability test to a third site.

37. The system of claim 34, wherein the billing data corresponds to a business.

38. The system of claim 34, wherein the billing data corresponds to an individual consumer.

39. The method of claim 34, further comprising the step of generating instructions regarding payment responsive to the results of the reasonability test.

40. The method of claim 34, further comprising the step of transmitting a payment.

41. The method of claim 34, further comprising the step of storing the billing data.

42. The method of claim 41, further comprising the step of generating a report based on the stored billing data.

43. The method of claim 34, further comprising the following steps:

generating financial information regarding the billing data; and communicating the financial information to a third site.

44. The method of claim 43, further comprising the step of converting the financial information into a customer-specific format prior to communicating the financial information to the third site.

45. The method of claim 34, further comprising the following steps:

communicating the results of the reasonability test to a third site; and storing the results.

46. The method of claim 45, further comprising the step of communicating directions as to payment from the third site to a fourth site.

47. The method of claim 46, further comprising the step of storing the billing data, wherein the step of communicating the results comprises the step of synchronizing the stored billing data with the stored results.

48. A system for processing billing data from a vendor for a customer, comprising:

an intermediary database adapted to collect the billing data from the vendor and adapted to collect a reasonability criterion from the customer, said reasonability criterion comprising billing data analysis parameters; and a computer program adapted to perform a reasonability test on the collected billing data responsive to the reasonability criterion collected from the customer.

49. The system of claim 48, wherein the reasonability test comprises a means for generating a payment status for the invoice information, the payment status comprising a status selected from the group consisting of normal, need to review, and failed.

50. The system of claim 48, further including means for generating payment instructions.

51. The system of claim 48, further including means for transmitting a payment if the payment status includes instructions to pay.

52. The system of claim 48, wherein the reasonability criterion is selected from the group consisting of late charges, rate changes, unusually high or low invoice amounts, and unusually high or low usage amounts.

53. The system of claim 48, further comprising means for generating financial information regarding the billing data.

54. The system of claim 48, further comprising means for generating report information regarding the billing data.

* * * * *